United States Patent
Lin et al.

(10) Patent No.: US 11,237,089 B2
(45) Date of Patent: Feb. 1, 2022

(54) METHOD AND SYSTEM FOR PARTICLE CHARACTERIZATION AND IDENTIFICATION

(71) Applicants: Hai Lin, Rancho Cucamonga, CA (US); Gregor Arthur Waldherr, Rancho Cucamonga, CA (US)

(72) Inventors: Hai Lin, Rancho Cucamonga, CA (US); Gregor Arthur Waldherr, Rancho Cucamonga, CA (US)

(73) Assignee: Hal Technology, LLC, Fontana, CA (US)

( * ) Notice: Subject to any disclaimer, the term of this patent is extended or adjusted under 35 U.S.C. 154(b) by 186 days.

(21) Appl. No.: 16/271,755

(22) Filed: Feb. 8, 2019

(65) Prior Publication Data
US 2020/0256777 A1 Aug. 13, 2020

(51) Int. Cl.
*G01N 15/00* (2006.01)
*G01N 15/02* (2006.01)
*G01N 15/10* (2006.01)

(52) U.S. Cl.
CPC . *G01N 15/0205* (2013.01); *G01N 2015/1087* (2013.01)

(58) Field of Classification Search
CPC .................. G01N 15/0205; G01N 21/65
See application file for complete search history.

(56) References Cited

U.S. PATENT DOCUMENTS

| | | | |
|---|---|---|---|
| 8,582,089 B2* | 11/2013 | Nelson | G01N 33/227 356/73 |
| 10,359,350 B1* | 7/2019 | Lin | G01N 15/1434 |
| 10,948,416 B2* | 3/2021 | Brannstrom | G01N 21/65 |
| 2013/0228705 A1* | 9/2013 | Nishikawa | G01N 21/64 250/459.1 |

* cited by examiner

*Primary Examiner* — Rebecca C Bryant

(57) ABSTRACT

Disclosed herein is a novel, compact, real time optical particle identification and characterization system and method of use within both gaseous and liquid media. The system can implement elastic and/or inelastic light scattering techniques simultaneously and complimentarily under the same sensor platform. By separating the sensing components from the electro-optical unit and using optical fibers for interconnection, only the sensing components need to be exposed to the environmental conditions. This reduces the design constraints on the electro-optical unit and permits the incorporation of optical components into the sensor probe that can withstand high-temperature, high-pressure, and corrosive environments. Thus, the system can be used in benign, moderate, and harsh environments.

20 Claims, 6 Drawing Sheets

METHOD AND SYSTEM FOR PARTICLE CHARACTERIZATION AND IDENTIFICATION

GOVERNMENT RIGHTS

The invention described herein was made under U.S. Navy contract numbers N68335-14-C-0080, N68335-16-C-0499, and N68335-18-C-0388. The government may have rights under this invention.

REFERENCES CITED

U.S. Patent Documents

| Document Number | Date | Name | US Classification |
| --- | --- | --- | --- |
| U.S. Pat. No. 10,139,329 B2 | November 2018 | Owen | |
| U.S. Pat. No. 9,714,967 B1 | July 2017 | Weickert et al. | 324/456 |
| US-2016/0313233 A1 | October 2016 | Zangmeister et al. | 356/416 |
| U.S. Pat. No. 8,582,089 B2 | November 2013 | Nelson et al. * | 356/73 |
| US-2013/01228705 A1 | September 2013 | Nishikawa et al. * | 250/459.1 |
| US-2010/0288921 A1 | November 2010 | Wang et al. | 250/287 |
| U.S. Pat. No. 7,675,619 B2 | March 2010 | Danehy et al. | 356/337 |
| U.S. Pat. No. 7,518,719 B2 | April 2009 | Sprenger et al | 356/243.2 |
| US-2009/0039249 A1 | February 2009 | Wang et al. | 250/287 |
| U.S. Pat. No. 7,404,929 B2 | July 2008 | Fulghum, Jr. | 422/82.05 |
| U.S. Pat. No. 7,260,483 B2 | August 2007 | Gard et al. | 702/22 |
| U.S. Pat. No. 7,106,442 B2 | September 2006 | Silcott et al. | 356/338 |
| U.S. Pat. No. 7,072,038 B2 | July 2006 | Quist et al. | 356/338 |
| U.S. Pat. No. 6,490,040 B1 | December 2002 | Berthold | 356/342 |
| U.S. Pat. No. 6,321,608 B1 | November 2001 | Wagner et al. | 73/863.21 |
| U.S. Pat. No. 5,731,875 A | March 1998 | Chandler | 356/336 |
| U.S. Pat. No. 5,610,712 A | March 1997 | Schmitz | 356/335 |
| U.S. Pat. No. 5,112,127 A | May 1992 | Carrabba et al. | 356/301 |
| U.S. Pat. No. 4,953,978 A | September 1990 | Bott et al. | 356/336 |
| U.S. Pat. No. 4,798,465 A | January 1989 | Knollenberg | 356/336 |
| U.S. Pat. No. 4,573,761 A | March 1986 | McLachlan et al. | 350/96.24 |

* cited by examiner

OTHER PUBLICATIONS

Hu, H., et al. "Determination of the refractive index and size distribution of aerosol from dual-scattering-angle optical particle counter measurements." Applied Optics, 2006. vol. 45, pp. 3864-3870.

Eidhammer, T., et al. "Determination of index of refraction and size of supermicrometer particles from light scattering measurements at two angles." Journal of Geophysical Research, 2008. vol. 113, D16206, 19 pages.

TECHNICAL FIELD

The invention relates to optical sensors which detect particles, dust, and debris in both gaseous and liquid media, and particularly to sensors which can identify the composition of particles and simultaneously provide particle statistics including size, size distribution, and mass concentration under benign, moderate, and harsh environments. The system described herein has the added benefit of being applicable to harsh environments such as within corrosive liquids or within the extreme temperature, pressure or severe electro-magnetic interference (EMI) environments of engines, including but not limited to gas turbine engines, power generation engines, industrial engines, land-based engines, or marine engines.

BACKGROUND ART

This invention was initially inspired by the long felt need to quantify and identify particles ingested by an aircraft gas turbine engine employed in an aircraft. Aircraft are increasingly called upon to operate in harsh environments, particularly those with a significant presence of sand and dust. Ingestion of sand and dust by a gas turbine engine can result in erosion of hardware, clogging of passageways, and deterioration of cooling systems. This leads to degradation of the engine's performance and ultimately could lead to engine failure. Engine manufacturers and customers would prefer to implement real-time health monitoring to detect airborne sand/dust and its penetration into the core of the engine where the most substantial damage can occur. Available particle identification systems, which may identify the individual particle material or composition of a group of particles, are not compact or rugged enough to be applied to either real time or the harsh environment encountered within a gas turbine engine. Such a harsh environment may have extreme temperatures ranging from −100° F. (−73° C.) to 570° F. (300° C.) (already demonstrated) or higher and pressure ranging from 0 psia (0 MPa) to 250 psia (1.7 MPa) or more. Likewise, measurements within corrosive liquid and pressurized liquid environments, such as those found in the semiconductor industry or chemical industry, may also present problems for traditional particle identification and characterization systems.

Several spectroscopy techniques such as Raman spectrometry, mass spectrometry (MS) and ion-mobility spectrometry (IMS), have been commonly used to determine material composition and each technique cannot identify all materials. Moreover, these systems are typically bulky and intrusive and likely cannot survive or function properly under extreme conditions. As the government imposes ever more stringent regulations regarding the emission of particulate matter (PM) by engines, the monitoring of those emissions becomes paramount.

The use of optical scattering methods for particle characterization has been repeatedly demonstrated for applications such as contamination monitoring in clean facilities, pharmaceutical and food preparation, indication of indoor air quality, and the monitoring of environmental pollution caused by industrial and vehicular emissions, biomass burning, volcanic activity, and dust upheaval by wind and vehicles. These methods are typically applied in relatively benign environments where temperature and pressure do not differ significantly from atmospheric conditions. Traditional particle measurement systems with integrated sensor, laser source, and detector electronics will not survive or function properly under such extreme conditions. Particle measurement systems employing these methods typically integrate the sensor probe components and electronic processing and control components into one unit. As such, the more delicate components of the particle measurement system cannot generally survive in harsh environments. Also, particle measurement systems which use electrical signals near a harsh environment are prone to electromagnetic interference (EMI) effects. To date, no suitable technologies were developed to address above requirements or applied to these applications.

Accordingly, the present disclosure is directed to a novel sensing methodology that addresses the aforementioned deficits. More specifically, the present disclosure is directed to a particle identification system that includes one or more sensor probes interconnected via optical fibers or cables to one or more isolated electro-optical units to detect dust particles and/or debris within gaseous and liquid media. By separating the passive optical components in the sensor probe(s) from temperature (and condition) sensitive components, such as the laser(s) and electronics within the electro-optical unit(s), only the sensor probe components are exposed to any potentially harsh environments. Also, since optical fibers are used to interconnect the sensor probe and electro-optical unit the system is also more resistant to EMI effects. The sensor probe can be a sealed against the environment, since it only contains passive optical components, increasing its ability to survive in harsh gaseous and liquid environments. Such a probe can identify the composition of particles within both gaseous and liquid media while simultaneously providing particle statistics such as size, size distribution, and mass concentrations of particles. Along with traditional benign environment applications, it also addresses the need to endure harsh environments which may include high temperatures, high pressures, corrosive liquids, and EMI.

SUMMARY OF INVENTION

In general, the disclosed invention relates to, but is not limited to, the determination of particle material identification and statistics in gaseous and liquid media. Specifically, this disclosure relates to the design and construction of an apparatus that uses light scattering to make such measurements. Since the sensor probe portion of this apparatus may be configured with one or more light transmitters and one or more light receivers, a combination of optical techniques may be applied within a single, compact sensor probe. More importantly, this apparatus can incorporate elastic and non-elastic light scattering techniques for material identification under the same sensor probe platform. Three specific techniques described herein are multi-angular light scattering (MALS), multi-wavelength light scattering (MWLS), and Raman scattering spectroscopy (RSS). Along with composition determination, this system can also measure particle statistics such as size, size distribution, and mass concentrations of particles, as described in U.S. Pat. No. 10,359,350 which is incorporated by reference herein in its entirety. This apparatus has optical sensing components connected by optical fiber to electronics which allows the electronic components to be remotely located and isolated from a harsh environment (FIG. 1). One or more light scattering techniques may be implemented together within a single sensor platform where the optical components within the sensor probe(s), the optical fiber(s) and/or cable(s), and the optics and electronics within the electro-optical unit(s) comprise the elements of the novel particle characterization and identification system outlined in this disclosure.

BRIEF DESCRIPTION OF THE INVENTION

The sensor probe(s) of the particle identification and characterization system contain the optical components necessary to manipulate the transmitted and received light to and from a detection zone (FIG. 2). Light transmitted into the sensor probe from the interconnecting optical fiber(s) is guided towards the detection zone by appropriate optical components known to those skilled in the art. Light scattered from the detection zone is received by those same or separate optical components and transmitted out of the sensor probe by the same or separate optical fiber(s). As such, only optical components are needed within the sensor probe head, allowing the sensor probe to withstand both benign and harsh environments. All the components of the sensor probe may be designed to survive low or high temperatures, low or high pressures, corrosive liquids, and EMI by appropriate choice of materials. There are many housing materials and optical materials, known to those skilled in the art, that can survive various pressure and temperature extremes. For example, a sensor probe with a stainless-steel housing, silica optical fibers, and optical elements made of silica and/or sapphire can withstand temperatures ranging from cryogenic to 1000° F. (538° C.) and provide resistance to many corrosive liquids. Since the signals within the sensor probe are optical, the sensor probe is inherently resistant to EMI. The various components of the sensing probe can be fixed together by various methods, known to those skilled in the art, including fusion, adhesives (epoxies, cements, etc.), and mechanical attachment (clamps, set screws, etc.). The method used to fix the components together may impose additional limits on the allowable pressure and temperature range. For example, fixing the components together using an epoxy with an upper useful temperature limit of 250° F. (121° C.) would impose that temperature limit upon the sensing probe itself.

The interconnecting optical fibers and/or cables transmit light between the sensor probe(s) and one or more electro-optical units (FIG. 2). These fibers may include connectors on either one end, or both ends of the fibers. When multiple fibers are incorporated into a single cable the cable ends may similarly include multiple or single connectors on either end or both ends of the cable. When connectors are not included on fiber or cable ends, the individual fibers are separately secured within the sensor probe(s) or electro-optical unit(s) to guide the light appropriately.

The electro-optical unit(s) contain the light source(s), optical receiver(s), and additional optical and electronic components to provide light to the sensor probe(s), receive light collected by those same probe(s), convert that light into electrical signals, and perform signal processing (FIG. 2). Each light source, such as a laser, is coupled into an optical fiber using methods known to those skilled in the art. An optical fiber is then connected to either the exterior of the electro-optical unit or directly to the sensor probe. Additionally, an optical fiber containing a light source may be connected to a fiber coupler to allow two-way transmission of light to and from the sensor probe. In this invention, a variety of optical receivers can be used, including one or more detectors, an array of detectors, or a spectrometer. Each optical receiver may also be coupled with an optical fiber using methods known to those skilled in the art. That optical fiber could then be connected to either the exterior of the electro-optical unit or directly to the sensor probe. Each receiver is situated at the end of a return signal pathway. While those return signal pathways may at times occupy the same optical fiber, they must ultimately separate into different return signal pathways, and possibly optical fibers, before reaching a receiver. Additionally, an optical fiber coupled to a receiver may be connected to a fiber coupler to allow two-way transmission of light to and from the sensor probe. The electronic components are used to drive the light sources(s), condition the output of the receiver(s), and may incorporate additional signal processing capabilities into the electro-optical unit.

Traditionally, particle characterization usually refers to measurement of particle size, size distribution as well as counts or mass concentrations. For this type of particle characterization, as few as a single light source and single detector is needed. Using a light source for illumination, a particle passing through the sensing location scatters light in all directions. An optical detector aimed at the sensing location from any orientation responds to a passing particle by generating a pulse signal whose amplitude depends on particle diameter, particle shape, and particle material. For certain detector orientations and arrangements, the amplitude of the pulse signal can be related monotonically to the particle diameter. For such orientations, as pulses are continually received over time, a histogram of particle diameters and material identities can be generated to provide a particle size distribution and additional particle statistics including average particle size and average material composition. Counting the total number of particles passing within a finite time can provide particle load rate (also known as total number concentration and similar). Given a particle distribution over a finite measurement time, in combination with known mass density of the particles, the mass concentration can be determined. Thus, using signal processing, the passage of multiple particles can generate many particle statistics including particle size distributions, total particle volume, average particle size, average particle surface area, number concentration (or particle load rates if the velocity is known), and mass concentration. This type of signal processing, excluding the material identification, is known to those skilled in the art and can be performed in hardware or software.

To identify particles, this apparatus can incorporate both elastic and inelastic light scattering techniques. For elastic light scattering the same light wavelength is transmitted and received, while for inelastic light scattering the received light wavelengths are different than the transmitted light wavelength. Three specific techniques pertinent for particle identification are described herein, elastic multi-angular light scattering (MALS), elastic multi-wavelength light scattering (MWLS), and inelastic Raman scattering spectroscopy (RSS). RSS identifies a material by its unique, multi-wavelength spectral signature (FIG. 3 and FIG. 4) which is well-known techniques and already applied to drug and counterfeit detections. Elastic scattering from particles is influenced by the refractive index, which is a unique physical property of a material, so it can be used to distinguish materials. MALS measures the particle scattering at two or more different angles and for different refractive indices the ratio of the responses at different angles is different as shown in FIG. 5. MWLS measures the particle scattering at two or more different wavelengths and can be used to identify materials with a strong wavelength-dependent refractive index (FIG. 6).

For MALS, only a single light source is necessary, but at least two detectors must be used to receive the scattered light from different angles. For MWLS, it is possible to use only one optical fiber to receive all wavelengths of light, but at least two light sources at different wavelengths must be used. The received light must be separated into the individual wavelength components and then routed to at least two detectors using wavelength dispersion or wavelength selection elements with methods known to those skilled in the art. For RSS, only one light source and one return signal pathway are required. The received light is routed to a spectrometer which typically includes an array of detectors to measure the spectrum of the scattering.

It is worth to point out that the above elastic or inelastic light scattering techniques could be implemented on the single probe platform individually or simultaneously. For certain materials, elastic light scattering technique may be more effective than inelastic light scattering or vice versa. Simultaneous implementation of two or more techniques may be necessary for complimentary or effective material identification of particles.

DETAILED DESCRIPTION OF THE INVENTION

The above, as well as other objects and advantages of this disclosure, will become readily apparent to those skilled in the art from reading the following description of an embodiment of the invention. The description and drawings illustrate exemplary embodiments of the invention and serve to enable one skilled in the art to make or use the invention and are not intended to limit the scope of the invention in any manner. With respect to the methods disclosed and illustrated, the steps presented are exemplary in nature, and thus, the order of the steps is not necessary or critical.

As used herein, the terms "first", "second", "third", and "fourth" may be used interchangeably to distinguish one component from another and are not intended to signify location or importance of the individual components.

The present disclosure uses an in-situ approach wherein a sensor probe separates the light source(s), receiver(s), and electronics from the harsh measurement zone by using an interconnecting optical fiber cable. Some of the interconnecting optical fibers transmit the light source(s) to the detection zone and may also simultaneously transmit the measured scattered light back to the receivers through either a single cable connector or multiple connectors. The optical fiber configuration can range anywhere from multiple single-core fibers to one multi-core fiber to a single single-core fiber with multiplexed data to any combination thereof. Individual optical fibers can be either multi-mode optical fibers, single-mode optical fibers, or polarization-maintaining optical fibers, as determined by the requirements of the sensor system and the system may include any combination of these optical fibers. If desired, the sensor probe could be mounted flush to the process wall and have a single connector. The sensor probe contains beam-shaping optics, collection optics, optical apertures, and optical fibers, all of which can be designed to survive high temperature environments, since only optical components and no electronic components are included in the sensor probe. In this application, beam-shaping can refer to both adjusting the size and shape of the light beam and, if desired, to changing the relative energy distribution of the light beam for desired performance of an optical sensor. For applications with spatial variation in particle characteristics and materials, such as engine dust ingestion, multiple sensors could also be placed at multiple sensing locations.

Figure 1:
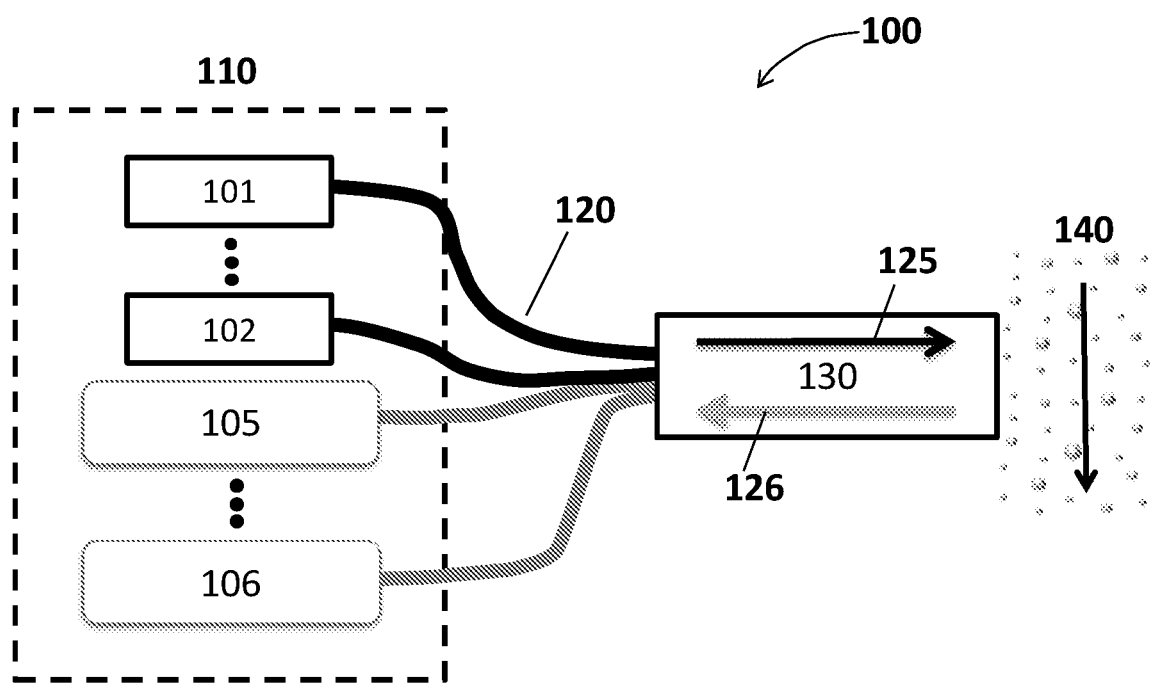
FIG. 1 shows the particle identification and measurement system concept with sensor probe, electro-optical unit including light sources and detectors, and interconnecting optical fiber(s).

The fiber-based probe design is flexible and allows implementation of single or multiple light sources and single or multiple optical receivers at the same time. FIG. 1 illustrates in schematic form, a sensor system 100 for accomplishing the invention. More specifically, there is provided an electro-optical unit 110 connected via optical fibers 120 to a sensor probe 130 to measure the particles in a particle-laden flow 140. An entire sensor system may also include one or more electro-optical units 110, one or more optical fibers 120, one or more sensor probes 130, and may interrogate one or more particle-laden flows 140. The electro-optical unit 110 may include one light source 101 or multiple light sources 102 and one detector 105 or multiple detectors 106 along with any additional optical components necessary to control the light transmitted from the light sources and to control the processing of the light returned into the detectors. The sensor probe 130 consists of only optical components to control the light transmitted to and from the particle-laden flow 140. The sensor probe 130 may include single or multiple pathways for both transmitted light 125 and returned light 126. Interconnection with optical fibers provides the advantage of flexible sensor mounting and placement while only exposing the sensor probe to harsh environments with moderate or high temperature and pressure, such as found in a gas turbine engine. Furthermore, this design allows a 1×n (or even m×n) coupler to be used if more light sources, more detectors, and/or more locations are monitored. In addition to design requirements such as dust size and range, flow rate or particle velocity, and concentration limit mentioned above, typically, sensor calibration for dust size quantitation is also required.

Figure 2:
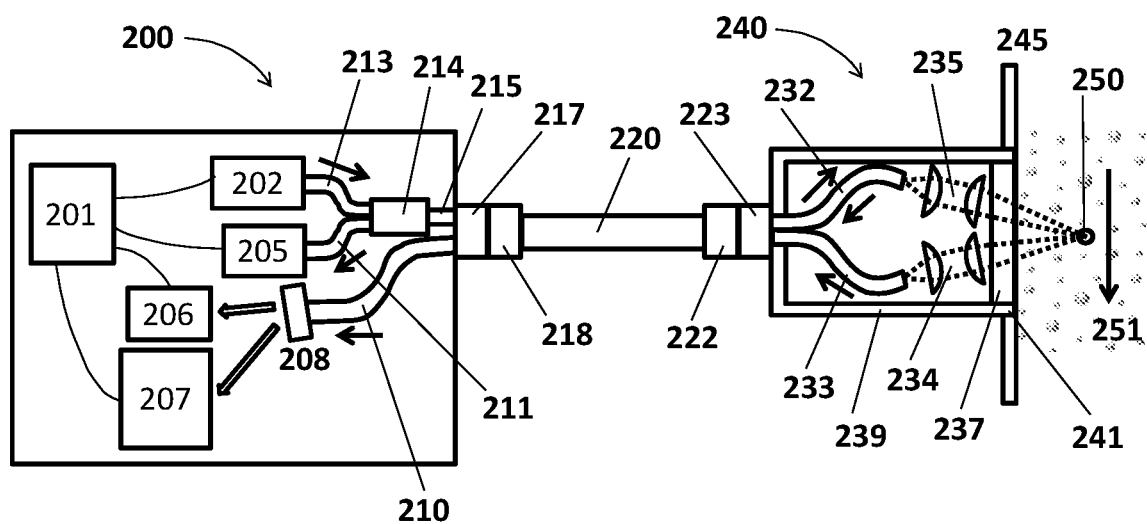
FIG. 2 illustrates an example of a specific flush-mounted implementation of the particle identification and measurement system with one laser light source, one light source pathway, and three return signal pathways, where a light source pathway and a return signal pathway are carried along the same optical fiber. A flush-mounted implementation allows for minimal flow field disturbance such as for engine flows.

FIG. 2 shows an example implementation of this invention with one light source, one light source pathway, and three return signal pathways. This example permits complimentary material identification by simultaneously using MALS and RSS, and characterization of particle size, distribution, and concentration. More specifically, a sensor probe 240 is connected to an electro-optical unit 200 using an optical fiber cable 220. A light source 202 transmits light through an optical fiber 213 to a directional fiber coupler 214 if the transmitted light shares a single fiber with the returned light. That fiber coupler transmits the light via optical fiber 215 to a first optical fiber connector 217 that is at the exterior of the electro-optical unit 200. Optical fiber connector 217 and all other optical fiber connectors in the system may consists of single or multiple fiber cores and may also consist of more than one connector. Similarly, optical fiber cable 220 may consist of single or multiple fiber cores and may also consist of more than one cable. A second optical fiber connector 218 connects to fiber connector 217 and transmits the light source through an optical fiber core in the optical fiber cable 220 to a third optical fiber connector 222. A fourth optical fiber connector 223, on the exterior of the sensor probe 240, connects to fiber connector 222 and transmits the light source into the sensor probe 240 via optical fiber 232. It should be noted that any pair of optical fiber connectors (217 and 218 or 222 and 223) may be replaced by a continuous section of optical fiber, removing the ability to separate the optical path at that location. The light leaving optical fiber 232 may either be directly transmitted or may be reshaped using optical components 235, such as lenses. The transmitted light then passes through a window 237 to a sensing location 250 in the particle-laden flow 251. The spatial beam-shaping performed in 235 is done to achieve a defined performance at 250 and is known to those skilled in the art. In this illustration, the sensor probe 240 is mounted flush to a wall 245 which confines the particle-laden flow 251. Whether the sensor probe is mounted flush is dependent on the application and is readily apparent to those skilled in the art. All elements of the sensor probe 240 are contained within an outer housing 239 with openings for the fiber connector 223 and window 237. The body of outer housing 239 may also have a predetermined shape, such as a cylinder with a threaded end 241, configured to secure the probe into existing locations in the measurement application.

Particles in the sensing location 250 return scattered light back into the sensor probe 240. The first scattered light passes into optical fiber 232 either directly or by passing through optical components 235. Similarly, the second scattered light passes into optical fiber 233 either directly or by passing through optical components 234. The spatial beam-shaping performed in 235 and 234 also achieves a defined performance at 232 and 233 for collected light and is known to those skilled in the art. Light entering optical fiber 232 passes back through the optical fiber cable 220 and enters optical fiber 215 using a pathway shared with the transmitted light. In the directional fiber coupler 214 the returned scattered light is separated from the transmitted light and sent into optical fiber 211 and on to detector 205. Any method, known to those skilled in the art, can be used to separate the transmitted and returned light when they share the same fiber, for example polarization rotation or directional coupler. Light entering optical fiber 233 is directed sequentially through the fourth optical fiber connector 223, the third optical fiber connector 222, the optical fiber cable 220, the second optical fiber connector 218, the first optical fiber connector 217, and into optical fiber 210 where it is separated using optics 208 and then passed on to detector 206 and spectrometer 207. The light separation by optics 208 may consist of any separation method including combinations of beamsplitters, wavelength dispersion, wavelength rejection, or wavelength selection elements. Example elements of 208 may include a beamsplitter, notch filter, long-wave-pass filter, or dichroic filter and are known to those skilled in the art. The components of the electro-optical unit 200 are controlled by a controller/processor 201 which provides voltage control, current control, and signal control to light source 202, detector 205, detector 206, and spectrometer 207 and also processes the signals from detector 205, detector 206, and spectrometer 207. The controller/processor 201 may also include individual control elements or signal processing elements at each component.

An example of processing hardware that may be included in 201 is a signal classifier. The signal classifier is an electronic device such as a FPGA- or DSP-based multichannel signal analyzer that classifies particles based on the pulse height of their scattering signal and is known to those skilled in the art. Based on the pulse amplitude of the detector signal created by a passing particle, the diameter of the particle can be classified. The classified diameters are then processed into particle statistics such as particle size distribution, particle load rate (also known as total number concentration and similar), and particle mass concentration. For engine applications, the particle identification and measurement system may be interfaced with an engine control unit to provide both engine health management and early warning of periods of excessive dust ingestion.

It should be obvious to those skilled in the art, that many variations on FIG. 2 are possible. Additional or fewer light sources, receivers, fibers, and connectors may be included in the sensor probe 240, the electro-optical unit 200, and the optical fiber cable 220. Additional sensor probes 240, electro-optical units 200, and optical fiber cables 220 may also be included in a complete particle measurement system, especially for measurements at multiple distributed locations. The location of one optical fiber with respect to another optical fiber within the sensor probe can also be flexible. For example, optical fiber 232 and optical components 235 could be adjacent to optical fiber 233 and optical components 234, to build a compact probe. Alternately, a prescribed distance could separate the optical fibers and components, to examine different aspects of the particle light scattering. Additionally, various elements can be combined to optimize part count and aid in assembly. For example, some optical elements in 235 could be combined with optical fiber 232 to make an optical fiber focuser or an optical fiber collimator. Additionally, window 237 may be combined with other optical elements in 235 or 234 to convert the window into a focusing lens or a beam spreader. A single sensor probe 240 may also have multiple sensing locations 250, which may require additional fibers 232 and/or 233 and additional beam-shaping optics 234 and/or 235. Pairs of optical fiber interconnections, such as 222 and 223, may also be replaced by continuous optical fibers, removing connectivity but improving signal transmission and/or averting possible connection contamination.

Each of the elastic scattering and inelastic scattering techniques can be implemented individually or simultaneously in a sensing system consisting of a sensor probe 240, electro-optical unit 200, and an optical fiber cable 220. Since the optical fiber cable 220 and the sensor probe 240 are merely optical conduits which can operate over a wide range of wavelengths, the type of scattering being sensed depends on the light source(s) 202 being transmitted into the fiber cable 220 and the receiver(s) 205, 206, 207 that receive the light from the fiber cable 220. Thus, the electro-optical unit 200 determines the type of scattering being measured. Implementing only one type of scattering is straightforward. Implementing more than one type of scattering with one laser source is demonstrated in FIG. 2. Implementing more than one type of scattering using different light sources requires either coupling of those light sources 202 into a single optical fiber 215, or multiple optical fibers 215. If multiple optical fibers 215 are used, then the subsequent optic elements must also be similarly multiplied. For example, if fiber 215 is duplicated then there needs to be an additional fiber within fiber cable 220, an additional optical fiber 232, and possibly additional optical components 235.

Figure 3:
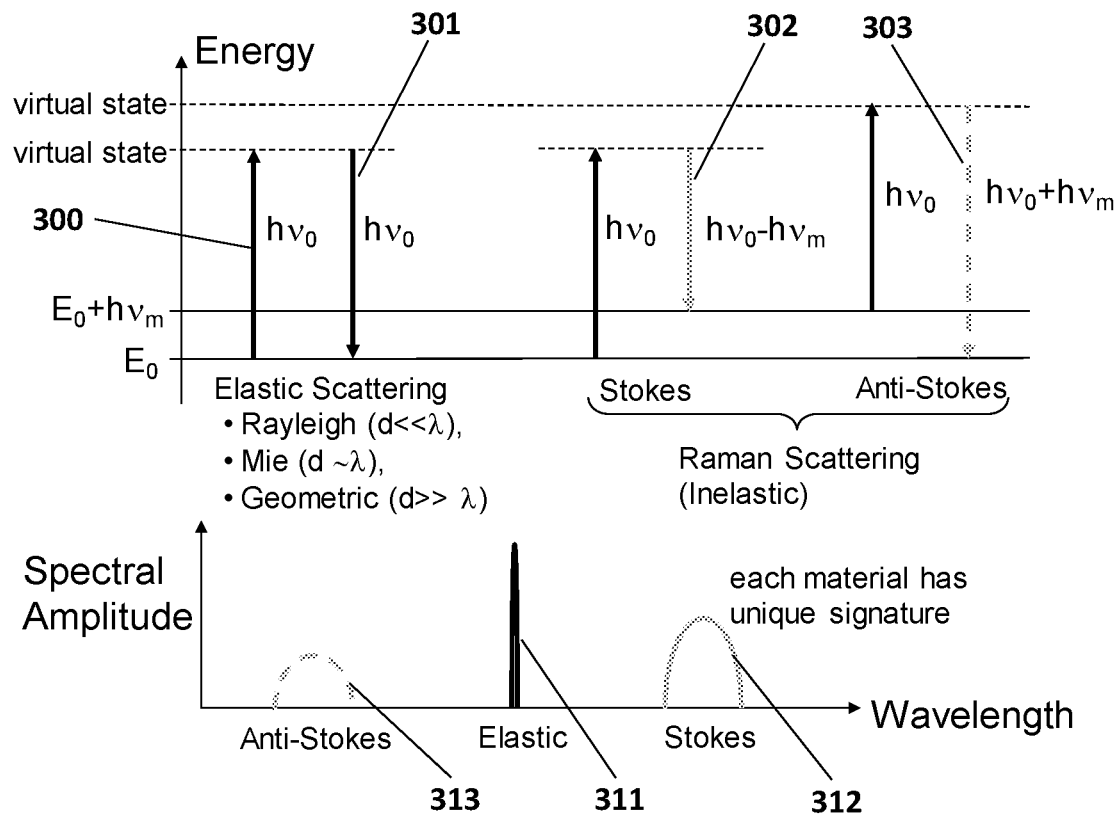
FIG. 3 describes both elastic scattering and inelastic scattering with an energy-level diagram (upper) and a spectral plot (lower).

Both elastic and inelastic scattering techniques are described in FIG. 3 using an energy-level diagram (known as a Jablonski diagram for molecules) and a spectral plot (amplitude vs. wavelength). For both elastic and inelastic scattering, incident light 300 increases the energy of a molecule from an initial state to a virtual state. For elastic scattering, the molecule scatters light 301 back at the same wavelength as incident light 300. Depending on the proportion of particle size to incident light wavelength, elastic scattering is also sub-categorized by different scattering regimes. The Rayleigh scattering regime occurs for particle diameters much smaller than the light wavelength, the Mie scattering regime occurs for particle diameters of similar order as the light wavelength, and the geometric scattering regime occurs for particle diameters much greater than the light wavelength. For inelastic Raman scattering, the molecule scatters light back at different wavelengths. For scattering light energy 302 less than the incident light energy 300, or a scattering light wavelength 312 longer than the incident light wavelength 311, it is termed Stokes Raman scattering. Conversely, for scattering light energy 303 greater than the incident light energy 301, or a scattering light wavelength 313 shorter than the incident light wavelength 311, it is termed anti-Stokes Raman scattering.

Figure 4:
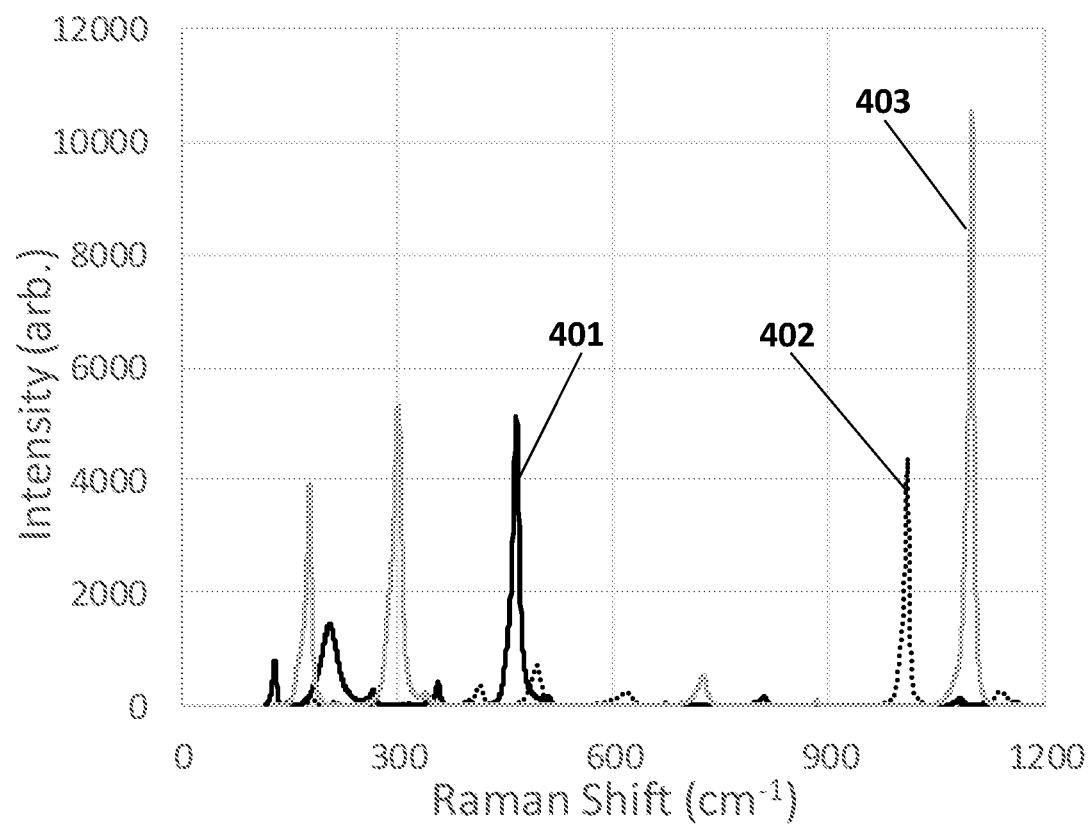
FIG. 4 displays the unique Raman spectra for a few selected compounds.

For RSS, only one light source and one return signal pathway are required, and the returned light is routed to a spectrometer which typically includes an array of detectors to measure the spectrum of the scattering at wavelengths different from the incident light wavelength. To implement RSS in FIG. 2, optics 208 would be an optical filter to significantly reduce the incident light source contribution into spectrometer 207. That optical filter could be a notch filter, long-wave-pass filter, dichroic filter, or similar and is known to those skilled in the art. Optionally, optics 208 could reflect or transmit light into detector 206 for elastic scattering measurements and simultaneously transmit or reflect light into a spectrometer 207 for inelastic scattering measurements. Also, in FIG. 2, the laser source 202 could be a continuous-wave source or a pulsed laser source. FIG. 4 demonstrates the unique spectral signatures for compounds of quartz 401, gypsum 402, and dolomite 403. All molecules have unique signatures and comparison of a measured spectrum must be made to a library of known spectra to determine the material. If only a few specific molecules are being interrogated, the array of detectors in a spectrometer may be replaced by discrete detectors that only receive light from Raman peak location(s). It should be noted that compact, palm-sized spectrometers are commercially available to keep the entire particle measurement system compact.

Figure 5:
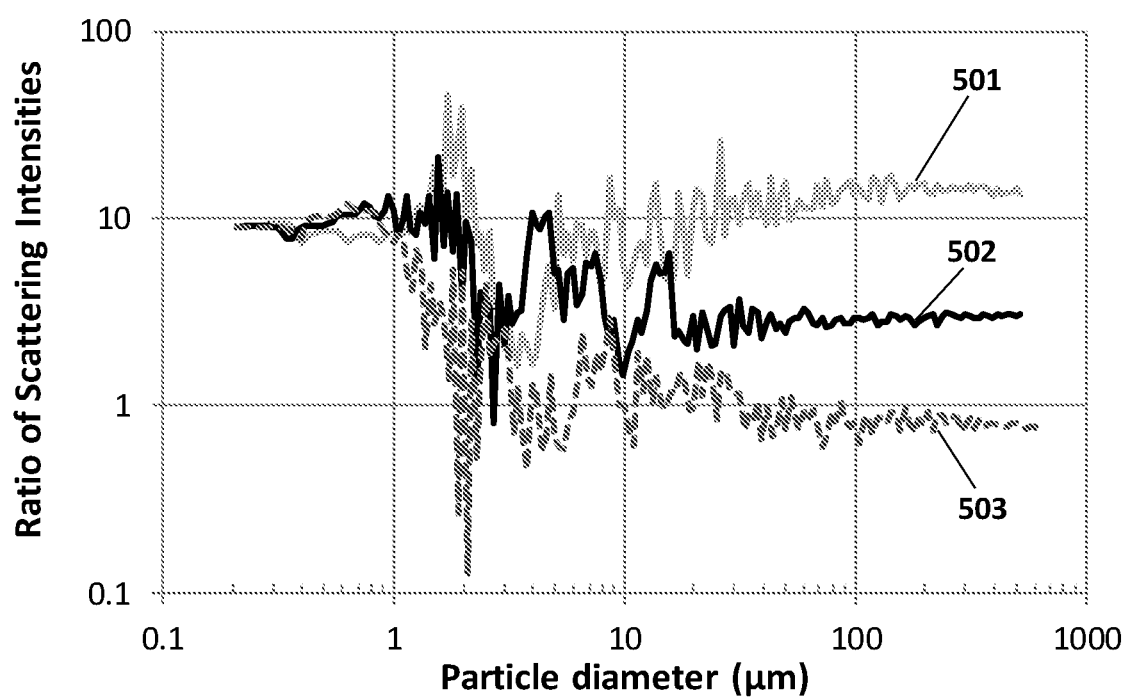
FIG. 5 illustrates example computer simulations of the effect of refractive index on the ratio of scattering intensities from two receivers at different angles.

For MALS, the particle scattering is measured at the same wavelength as the incident light and at two or more different angles. For materials having different refractive indices the ratio of the scattered light measured at two different angles is typically different. Only a single light source is necessary for MALS, but at least two separate return signal pathways must be used to measure the scattered light from different angles. Each return signal pathway is then routed to a detector for measurement. FIG. 5 shows an example of computer simulations for the ratio of scattering intensities between two receivers at different collection angles. The different curves 501, 502 and 503 are the intensity ratios for different refractive indices. In FIG. 5, theoretical simulations based on Mie theory for refractive indices of 1.33 (501), 1.51 (502), and 1.66 (503) are shown. These different ratios allow the determination of the refractive index of the particle which is a unique property of a material. There are many possible combinations of the measured intensities that allow distinction of the refractive indices. Along with the ratio of two intensities, other mathematical processing, such as addition and subtraction of intensities, can provide alternative means of determining the refractive index. In FIG. 2, MALS would be performed using laser source 201, detector 205, detector 206, and the light entering fibers 232 and 233 would come from scattering at different angles.

Figure 6:
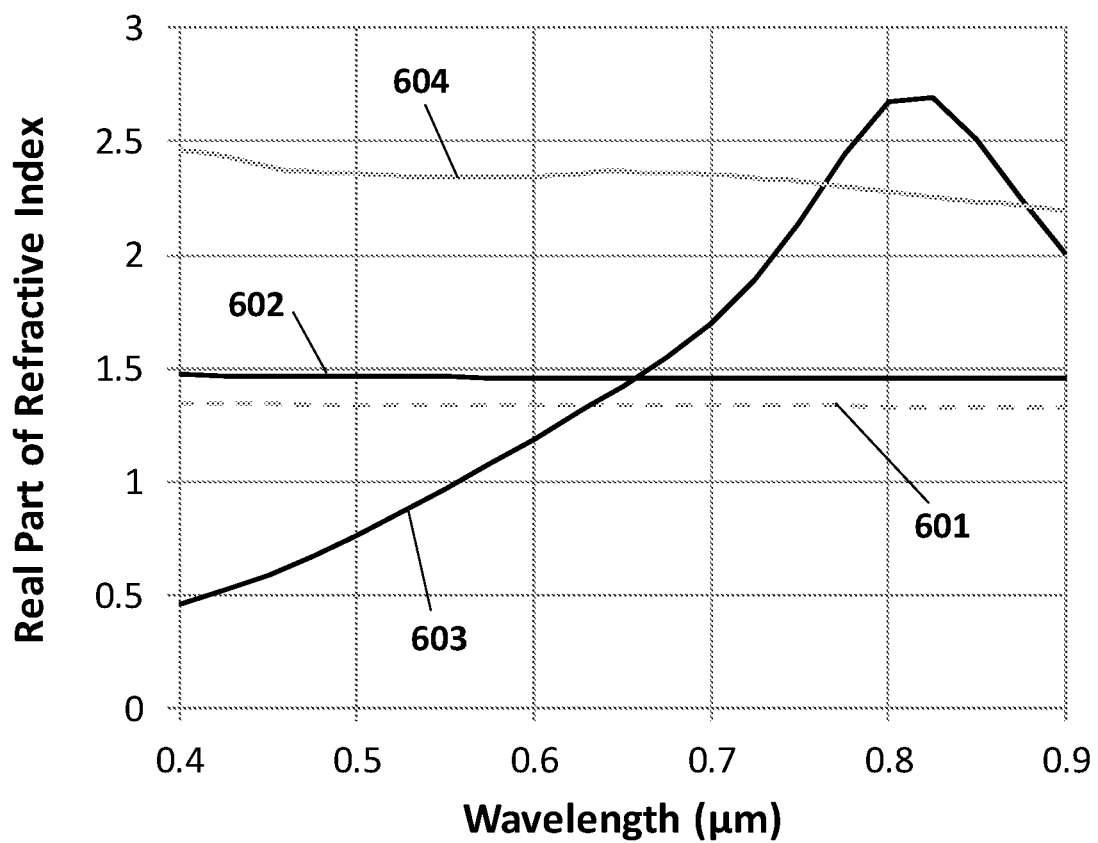
FIG. 6 illustrates the refractive index variation with wavelength for a few selected compounds. Some compounds are relatively invariant while others vary significantly.

For MWLS, the particle scattering is also measured at the same wavelength as the incident light but uses two or more different wavelengths of incident light. This incident light could be provided by any combination of multi-wavelength sources and/or single-wavelength sources and would be known to those skilled in the art. This method can be used to identify materials with a strong wavelength-dependent refractive index. FIG. 6 shows the wavelength-dependence of the refractive index for some representative materials. Taking examples of water 601 and silica 602, there is very little wavelength dependency, but for aluminum 603 and magnetite 604, the refractive index varies significantly with wavelength. For MWLS, it is possible to use only one optical fiber to return all wavelengths of light, but either two or more light sources at different wavelengths or a light source with multiple wavelengths must be used. The returned light must be separated into the individual wavelength components and then routed to at least two detectors using wavelength dispersion or wavelength selection elements with methods known to those skilled in the art. The light source 202 in FIG. 2 could be replaced by at least two light sources coupled together into one optical fiber 213 or by light sources introduced into separate optical fibers. Careful choice of the light wavelengths is important for MWLS. For example, if 0.5 µm and 0.65 µm light wavelengths were chosen, then magnetite 504 would show no difference in response.

The MALS, MWLS, and RSS measurement techniques provide complementary information about a particle's material and can all be implemented individually, in pairs, or simultaneously within the current invention. Under various circumstances, different combinations of measurement techniques may be desirable. For example, while RSS can be used to identify many materials, it cannot distinguish salt (halite) because salt has a broad, flat spectrum. In this scenario, the RSS technique could be coupled with MALS or MWLS to help identify salt. For another example, when measuring particles during rain, it may simply be desirable to distinguish water from other particle types. In that case, the MALS approach may be simpler to implement. The choice of techniques to implement within a single probe could be decided upon by those skilled in the art.

This written description uses examples to disclose the invention and enables any person skilled in the art to practice the invention, including making and using any devices or systems and performing any incorporated methods. The claims define the patentable scope of the invention, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber-optically based system for real-time, optical detection of individual particles and determination of their constituent composition while it is also capable of simultaneously measuring size distributions and mass concentrations in a flowing gas or a liquid, the system comprising:
   one or more compact sensor probes that can withstand a local benign or harsh environment each comprising one or more optical fibers and one or more optical elements which establish one or more detection zones outside the probe, where each optical fiber carries one or more optical pathways which are either light source pathways that transmit light into a detection zone or return signal pathways that collect scattered light from individual particles passing through a detection zone and those collected optical signals are relayed to electro-optical unit(s), which, unlike a sensor probe, can be separated from a local, potentially harsh environment;
   one or more electro-optical units each comprising one or more light sources coupled into optical fibers, one or more optical fibers used to receive collected light and relay that light to one or more receivers, and electronics for controlling light source(s), controlling receiver(s), and processing detected signal(s) based upon the type of scattering being measured, where each optical fiber carries one or more optical pathways which are either light source pathways that relay a light source to a compact sensor probe or return signal pathways that relay light collected by a sensor probe to a receiver selected from the group consisting of one or more detectors, or an array of detectors, or a spectrometer, where multiple optical pathways on an optical fiber are combined and split as necessary, where each receiver receives light at the end of a return signal pathway and converts the received optical signal into an electrical signal which contains information on the particle material along with particle size and particle shape, and where the electronics convert those electrical signals for processing to identify the particle material while also providing particle statistics;
   one or more optical fiber connections between the compact sensor probes and electro-optical units which interconnect optical pathways in an electro-optical unit to optical pathways in a compact sensor probe;
   where, when using the system for a multi-angle light scattering (MALS) technique from a detection zone, the system is configured such that one light source directs light to a light source pathway which directs light onto a detection zone, two or more return signal pathways are configured to collect elastically scattered light at two or more different scattering angles from individual particles passing through that same detection zone and direct the scattered light to two or more detectors, where elastically scattered light collected from two or more different scattering angles identifies a particle's material;
   where, when using the system for a multi-wavelength light scattering (MWLS) technique from a detection zone, the system is configured such that one or more light sources providing light at multiple wavelengths simultaneously direct light to one or more light source pathways which each direct light onto a single detection zone, two or more return signal pathways are configured to collect elastically scattered light at those multiple wavelengths from individual particles passing through that same detection zone and direct the collected light to two or more detectors, where the elastically scattered light at multiple wavelengths identifies a particle's material;

and where, when using the system for a Raman scattering spectroscopy (RSS) technique from a detection zone, the system is configured such that one light source directs light to a light source pathway which directs light onto a detection zone, one return signal pathway is configured to collect spectral light from individual particles passing through that same detection zone and direct the spectral light to a spectrometer which identifies a particle's material.

2. The particle identification and measurement system described in claim 1 where only one sensor probe and one electro-optical unit are used.

3. The particle identification and measurement system described in claim 1 where the sensor probe is configured to only implement one of the techniques from MALS and MWLS, where, when using the system for MALS, it is configured with one or more light sources and two or more detectors, and when using the system for MWLS, it is configured with one or more light sources providing light at multiple wavelengths.

4. The particle identification and measurement system described in claim 1 where an optical fiber contains one or more optical pathways, where, to combine multiple pathways onto an optical fiber, a fiber coupler would configure said optical fiber to both transmit and receive light, or a wavelength multiplexer would configure said optical fiber to transmit multiple wavelengths of light, or multiple wavelengths of light are collected into said optical fiber.

5. The particle identification and measurement system described in claim 1 where the sensor probe is configured to simultaneously implement a combination of any two or all three of the techniques from the group of MALS, MWLS, and RSS, where, when using the system for MALS, it is configured with one or more light sources and two or more detectors, where, when using the system for MWLS, it is configured with one or more light sources providing light at multiple wavelengths, where, when using the system for RSS, it is configured with a spectrometer which includes wavelength-dispersion elements and a multi-element detector, where multiple light sources propagate on the same or separate optical fibers, where two or more techniques share a light source or use separate light sources.

6. The particle identification and measurement system described in claim 1 configured with one or more light sources providing light at multiple wavelengths and multiple receivers, where multiple ultraviolet, visible or infrared wavelengths are provided by light source(s) which have same or different emitting wavelengths, or light source(s) with multi-wavelength capability and propagate on the same or different optical fibers, where return signal pathways are carried on the same or separate optical fibers.

7. The particle identification and measurement system described in claim 1 wherein the signals from two or more detectors are summed, differenced, ratioed, or computationally processed to identify a particle's material, provide noise cancellation, or provide other signal processing and interpretation.

8. The particle identification and measurement system described in claim 1 where the light on any single optical fiber with multiple optical pathways is split using one or more wavelength separation elements such as a dichroic filter or prism, where each wavelength separation element spectrally separates the light into two or more components and guides the first light component to a first receiver and the second light component to a second receiver or a further chain of wavelength separation elements and receivers.

9. The particle identification and measurement system described in claim 1 where processing electronics on at least one optical detection pathway includes a signal classifier, also known as a multichannel pulse height discriminator or signal analyzer, which provides a plurality of particle material identification or size channels numbering from 1 to 16,777,216 channels.

10. The particle identification and measurement system described in claim 1 where the interconnecting optical fibers for a sensor probe are all contained within one optical fiber cable.

11. The particle identification and measurement system described in claim 1 where additional optical elements are included on at least one light source pathway of a sensor probe to spatially shape the beam(s) and achieve a defined performance at the sensing location.

12. The particle identification and measurement system described in claim 1 where each optical pathway has its own set of optical elements to shape its light path or optical elements are shared among multiple optical pathways to shape multiple light paths.

13. The particle identification and measurement system described in claim 1 where the compact sensor probe has an outer housing and an optical window to contain the interior optical elements and isolate them from an external harsh environment, and that optical window is thick enough, rigidly supported, and sealed to the probe housing to allow the sensor probe to withstand pressures between 0 psia (0 MPa) and 750 psia (5.2 MPa).

14. The particle identification and measurement system described in claim 1 where the sensor probe is constructed from materials that can retain their function in the temperature range between −148° F. (−100° C.) and 1650° F. (900° C.).

15. The particle identification and measurement system described in claim 1 where the compact sensor probe has an outer housing which comprises a cylindrical shape and may include one end threaded to secure the sensor probe to a mounting location, as a cylindrical shape is easiest to fabricate, interface to a process, withstand external pressure, and seal.

16. The particle identification and measurement system described in claim 1 deployed multiply or in a distributed fashion where the system could share common light sources or multiple detectors.

17. A method using fiber optical components for real-time, optical detection of individual particles and determination of their constituent composition while simultaneously measuring the size distributions and mass concentrations in a flowing gas or a liquid, the method comprising:

providing a compact sensor probe in one or more locations that can withstand a local benign or harsh environment, wherein each sensor probe comprises one or more optical fibers and one or more optical elements which establish one or more detection zones outside the probe, where each optical fiber carries one or more optical pathways which are either light source pathways that transmit light into a detection zone or return signal pathways that collect scattered light from individual particles passing through a detection zone and those collected optical signals are relayed to electro-optical unit(s), which, unlike a sensor probe, can be separated from a local, potentially harsh environment;

providing one or more electro-optical units in one or more locations, each comprising one or more light sources coupled into optical fibers, one or more optical fibers used to receive collected light and relay that light to one or more receivers, and electronics for controlling light source(s), controlling receiver(s), and processing detected signal(s) based upon the type of scattering being measured, where each fiber carries one or more optical pathways which are either light source pathways that relay a light source to a compact sensor probe or return signal pathways that relay light collected by a sensor probe to a receiver selected from the group consisting of one or more detectors, or an array of detectors, or a spectrometer, where multiple optical pathways on an optical fiber are combined and split as necessary, where each receiver receives light at the end of a return signal pathway and converts the received optical signal into an electrical signal which contains information on the particle material along with particle size and particle shape, and where the electronics convert those electrical signals for processing to identify the particle material while also providing particle statistics;

providing one or more optical fiber connections between the compact sensor probes and electro-optical units which interconnect optical pathways in an electro-optical unit to optical pathways in a compact sensor probe;

where, when performing a multi-angle light scattering (MALS) technique from a detection zone, one light source directs light to a light source pathway which directs light onto a detection zone, two or more return signal pathways collect elastically scattered light at two or more different scattering angles from individual particles passing through that same detection zone and direct the scattered light to two or more detectors, where elastically scattered light collected from two or more different scattering angles identifies a particle's material;

where, when performing a multi-wavelength light scattering (MWLS) technique from a detection zone, one or more light sources providing light at multiple wavelengths simultaneously direct light to one or more light source pathways which each direct light onto a single detection zone, two or more return signal pathways collect elastically scattered light at those multiple wavelengths from individual particles passing through that same detection zone and direct the scattered light to two or more detectors, where the elastically scattered light at multiple wavelengths identifies a particle's material;

and where, when performing a Raman scattering spectroscopy (RSS) technique from a detection zone, one light source directs light to a light source pathway which directs light onto a detection zone, one return signal pathway collects spectral light from individual particles passing through that same detection zone and directs the spectral light to a spectrometer which identifies a particle's material.

18. The method of claim 17 wherein the particles being detected are entrained in the air flow of a gas turbine engine and the detecting is performed directly within that engine to obtain the concentration and composition of those particles and provide early warning and protection from excessive dust ingestion and/or dusts containing harmful compositions.

19. The method of claim 17 wherein the particles being detected are entrained in the flow of a filtration system and the detecting is performed directly in the flow both before and after filtration to obtain the change in concentration of different materials and monitor the effectiveness of a filtration system to different material types.

20. The method of claim 17 wherein the particles being detected are entrained in liquid media such as water, oils, or lubricants or in gaseous media such as air or industrial gases and the detecting is performed directly in said medium to indicate the presence and amount of specific particle material contamination, i.e., bearing wear could be indicated by metallic particles in lubricating oil.

\* \* \* \* \*